July 24, 1951   P. E. HAWKINSON   2,561,472
TOOL FOR REAMING HOLES IN PNEUMATIC TIRE CASINGS
Filed Jan. 30, 1950
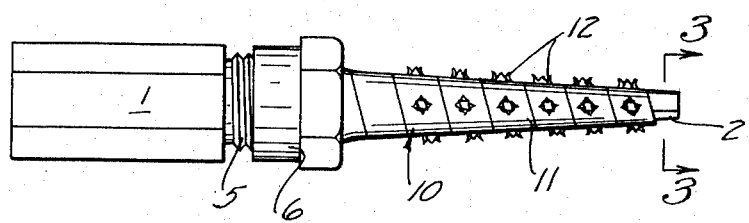
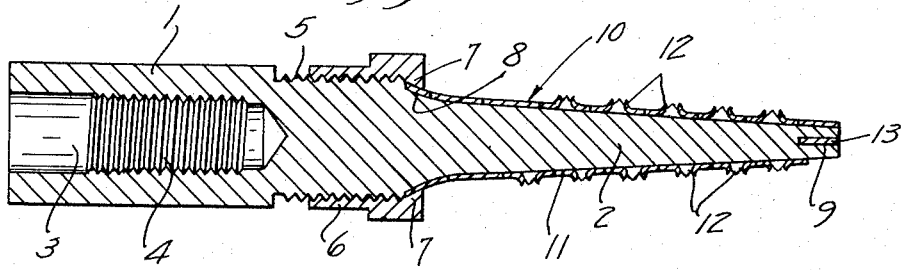
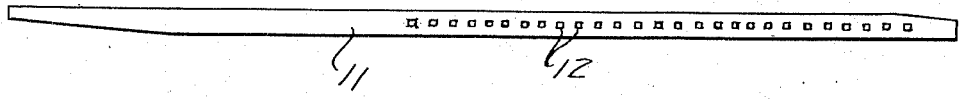
Inventor
Paul E. Hawkinson
By his Attorneys
Merchant & Merchant Patented July 24, 1951

2,561,472

UNITED STATES PATENT OFFICE 2,561,472

TOOL FOR REAMING HOLES IN PNEUMATIC TIRE CASINGS

Paul E. Hawkinson, Minneapolis, Minn., assignor to Paul E. Hawkinson Company, Minneapolis, Minn., a corporation of Minnesota Application January 30, 1950, Serial No. 141,337

3 Claims. (Cl. 29—78)

My invention relates generally to boring tools and, more specifically, to a novel device of this type particularly adapted for use in reaming or boring tapered holes in the casings of pneumatic tires and the like.

The primary object of my invention is the provision of a device of the class described, in which the tapered boring surface may be readily removed and replaced with a minimum of cost and effort.

A further object of my invention is the provision of a device of the class described, which is extremely efficient in its cutting or reaming operation.

The above and still further objects of my invention will become apparent from the following detailed specification, appended claims, and attached drawings.

Fig. 1 is a view in side elevation of a boring tool made in accordance with my invention;

Fig. 2 is an enlarged axial section of Fig. 1;

Fig. 3 is a transverse section taken on line 3—3 of Fig. 1 on an enlarged scale; and Fig. 4 is a view in plan of a strip of sheet metal forming the replaceable boring surface element of my invention.

My improved boring tool comprises an elongated head 1 having integrally formed therewith a tapered tip 2. The head 1 is provided with an axially-extended recess 3 which is threaded as indicated at 4. The head 1 is adapted to be screw-threaded to a motor shaft or to one end of a conventional flexible shaft, not shown, for rotation therewith.

Between its outer end and the tapered tip 2, the head 1 is screw-threaded as at 5, to have threaded engagement with a clamping nut 6 which is provided with a radially inwardly-projecting clamping flange 7. As shown in Fig. 2, the flange 7 overlies an outwardly flaring portion 8 of the tapered tip 2 for a purpose which will hereinafter become apparent.

A slot 9 extends diametrically of the tapered tip 2 and opens axially outwardly of the reduced end thereof to provide a seat for one end of a replaceable helically-wound cutting or boring element 10. The element 10 is made from an elongated strip 11 of sheet metal, preferably steel, and is slightly tapered at both ends. A plurality of longitudinally-spaced cutting teeth 12 project outwardly from the strip 11 and are preferably formed by piercing the strip with a pointed tool whereby the metal surrounding the holes made by the punching tool is extruded outwardly. The material forming the extruded portions is ruptured during the piercing of the strip, thus providing a plurality of jagged teeth in each of said extrusions. As shown, the strip 11 is helically wound on the tapered tip 2, one end being diametrically inturned as indicated at 13 and seated in the slot 9. The opposite end of the strip 11 terminates short of the threads 5 and encompasses the outwardly-flared portion 8 of the tapered tip 2, and lying therebetween and the flange 7 of the clamping nut 6. In this connection, it is important to note that the windings of the strip 11 extend generally in the same direction as the threads 5 of the head 1. In other words, the threaded portion 5 comprises what is commonly known as a right-hand thread, the strip 12 being wound in the same direction. Tightening of the clamping nut 6 on the threaded portion 5 causes the flange 7 to frictionally engage the underlying end of the strip 11 whereby to simultaneously wind the strip 11 tightly upon the tapered tip 2 and frictionally lock said underlying end of the strip 11 to the outwardly-flaring portion 8.

It will be noted that when the strip 11 is mounted on the tapered tip 2, thus forming the cutting or boring element 10, that the extruded cutting teeth 12 are circumferentially and axially spaced thereon. When the teeth 12 are worn, it is but necessary to remove the clamping nut 6 from the threaded portion 5 after which the worn strip 11 may be quickly and easily removed from the tapered tip 2, and a new strip 11 applied thereto.

My improved boring or reaming tool may be utilized to bore or enlarge holes in various relatively soft materials but is primarily useful in the dressing of holes or cuts made in pneumatic tire casings by nails, glass, or the like. I have found that by the use of my improved tool a relatively clean hole may be bored in the casing, thus making possible a more satisfactory repair to the casing.

While I have shown and described a commercial embodiment of my novel boring tool, it will be understood that the same is capable of modification without departure from the spirit and scope of the invention as defined in the claims.

What I claim is:

1. A boring tool comprising a mandrel having a head and a tapered tip, means for securing said head to a rotary shaft, a boring element formed from an elongated strip of sheet metal and having outwardly-projecting longitudinally-spaced cutting teeth thereon, said strip being helically wound upon said tapered tip, means for removably securing one end of said strip to the reduced end of said tip, and a clamping nut receivable over the tapered tip and having screw threaded engagement with said head, said nut having a radially inwardly-projecting clamping flange which frictionally engages the opposite end of said strip axially outwardly of the head.

2. The structure defined in claim 1 in which said means for removably securing one end of said strip to the reduced end of said tip comprises a diametrically-extended slot opening axially outwardly of the reduced end of said tip, and a diametrically-inturned end on said strip, said end being receivable within said slot.

3. The structure defined in claim 1 in which the windings of said strip extend generally in the same direction as the threads on said head, whereby frictional engagement of said opposite end of the strip with the clamping flange on said nut will cause said strip to be progressively tightened about said tapered portion as clamping pressure is applied thereto.

PAUL E. HAWKINSON.

REFERENCES CITED

The following references are of record in the file of this patent:

UNITED STATES PATENTS

| Number | Name | Date |
| --- | --- | --- |
| 2,310,211 | Brostrom | Feb. 9, 1943 |

FOREIGN PATENTS

| Number | Country | Date |
| --- | --- | --- |
| 251,811 | Germany | Oct. 12, 1912 |